United States Patent [19] [11] 3,765,627
Snyder [45] Oct. 16, 1973

[54] HARNESS AND AUXILIARY PARACHUTE RELEASE SYSTEM
[76] Inventor: Stephen L. Snyder, 311 Cherry Hill Blvd., Cherry Hill, N.J. 08034
[22] Filed: Apr. 28, 1972
[21] Appl. No.: 248,563

[52] U.S. Cl. .............................. 244/147, 244/151 A
[51] Int. Cl. ............................................. B64d 17/38
[58] Field of Search ................ 244/147, 149, 151 A, 244/151 B, 151 R

[56] References Cited
UNITED STATES PATENTS
2,481,116   9/1949   Horning .......................... 244/151 A
3,104,858   9/1963   Cooper ........................... 244/151 A
3,437,295   4/1969   Istel et al. ............................ 244/148

Primary Examiner—Milton Buchler
Assistant Examiner—Carl A. Rutledge
Attorney—Harvey B. Jacobson

[57] ABSTRACT

A main parachute canopy is released from the harness by simultaneous disconnection of a pair of buckle connectors upon actuation of a remote control mechanism including a push-pull cable assembly anchored to a mounting plate. The mounting plate forms part of a releasable lock device, carried on a pack secured to the harness, that will release after disconnection of the buckle connectors, thereby deploying an auxiliary parachute.

12 Claims, 4 Drawing Figures

PATENTED OCT 16 1973

HARNESS AND AUXILIARY PARACHUTE RELEASE SYSTEM

This invention relates generally to parachute controls and more particularly to the deployment of an auxiliary parachute in case of malfunction of a main parachute canopy.

Mechanical controls mounted on a parachute harness by means of which the parachutist may readily disconnect or release a main parachute canopy from the harness, are well known. In such control systems, the harness is coupled through the riser webs to the main parachute canopy by means of buckle connectors that are simultaneously released through a push-pull cable actuator device. Generally, a manual operator is mounted on the harness in such systems whereby the chutist may readily actuate the release. Such canopy release systems are disclosed for example in U.S. Pat. No. 2,481,116 to Horning. Such buckle release control systems cannot however function reliably unless the required actuating force is reduced to a proper value especially where the control system is designed to serve an additional function. Also, control mechanism mounting problems arise in connection with such control systems. It is therefore an important object of the present invention to provide a release control system for parachutes through which the buckle connectors between a parachute harness and the riser webs of a main parachute canopy are simultaneously disconnected sequentially followed by release of an auxiliary parachute in case of main canopy malfunction. A further object of the present invention is to provide in connection with such a release control system, facilities for mounting the control mechanism in an efficient and economic fashion.

In accordance with the present invention, the body harness of a parachute is coupled through the riser webs to a main canopy by a pair of releasable buckle connector devices such as those disclosed and claimed in U.S. application Ser. No. 231,507, filed Mar. 3, 1972, owned in common by the applicant in the present invention. The connector devices are simultaneously released by a push-pull cable assembly having terminals connected to each of the connector devices and an input terminal anchored to the mounting plate of a manual control mechanism. The control mechanism mounting plate is carried on a pack secured to the body harness which encloses an auxiliary parachute. The control mechanism furthermore features a force multiplying device interconnecting a manual operator with the input terminal of the push-pull cable assembly. The manual operator is also connected to a releasable lock device by means of which the mounting plate is secured to the auxiliary canopy pack and holds the pack closed. Thus, the lock device is released by a continued pull on the manual operator after the main canopy is released by disconnection of the harness buckle devices aforementioned.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

Figure 1:
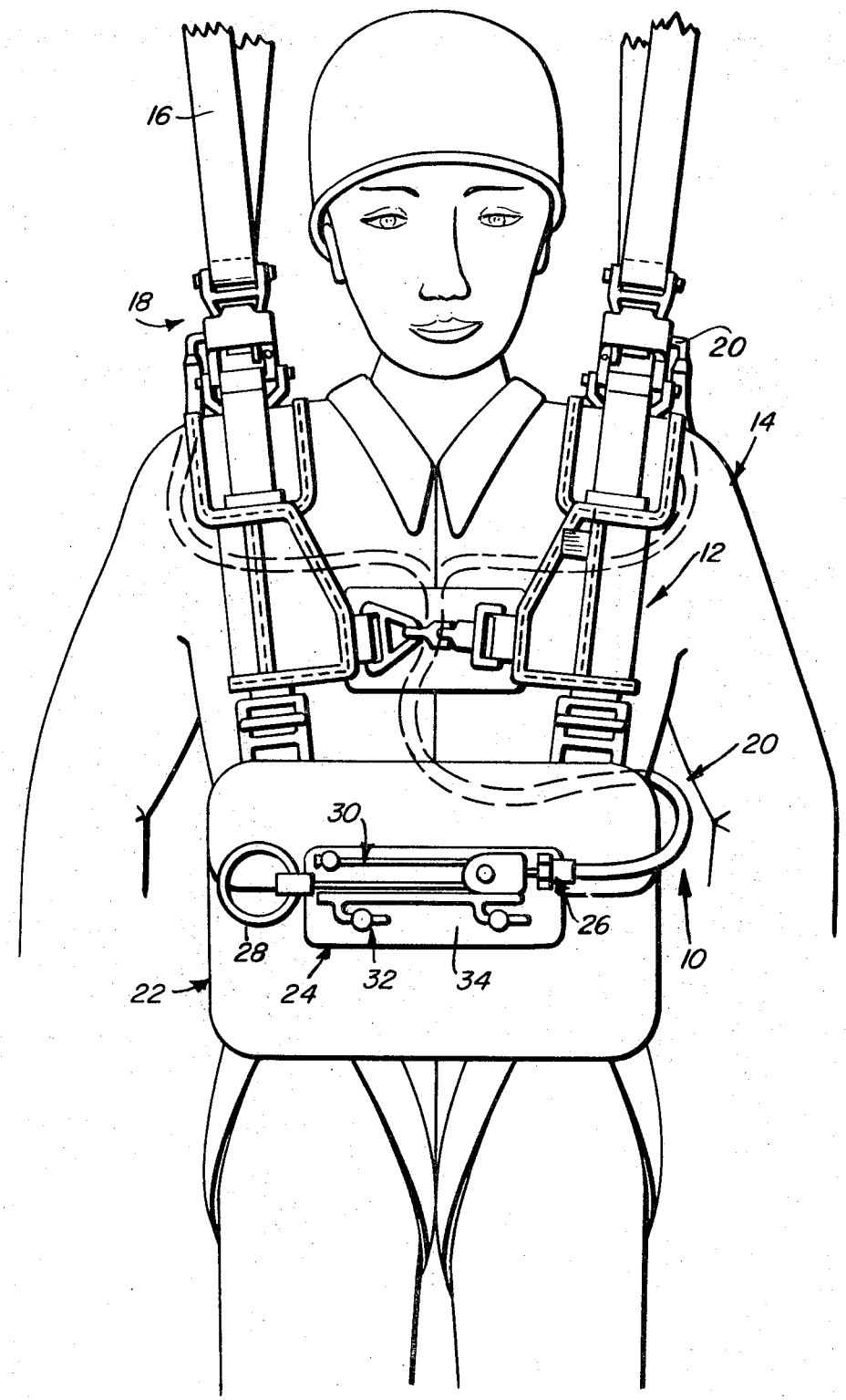
FIG. 1 is a front elevational view showing the parachute control system of the present invention.

Referring now to the drawings in detail, FIG. 1 illustrates the parachute control system of the present invention generally denoted by reference numberal 10. The control system is associated with a parachute body harness generally referred to by the reference numeral 12 which is shown to be installed on a parachutist 14 in FIG. 1. Body harnesses of this type are well known and any suitable harness may be utilized in accordance with the present invention. The body harness 12 however, is releasably coupled to the usual riser webs 16 interconnected by the usual suspension lines (not shown) to a main parachute canopy (not shown) by means of a pair of buckle connector devices 18. These buckle connector devices may be of the type disclosed in the copending U.S. application Ser. No. 231,507, filed Mar. 3, 1972 aforementioned, although not necessarily limited thereto. Such releasable connector devices are provided with output terminals 19 associated with an elongated, mechanical type, push-pull cable assembly generally referred to by reference numeral 20. It will be apparent, that when a pull is exerted on the cable assembly, both of the connector devices 18 are disconnected in order to release the main parachute canopy from the body harness 12.

Figure 4:
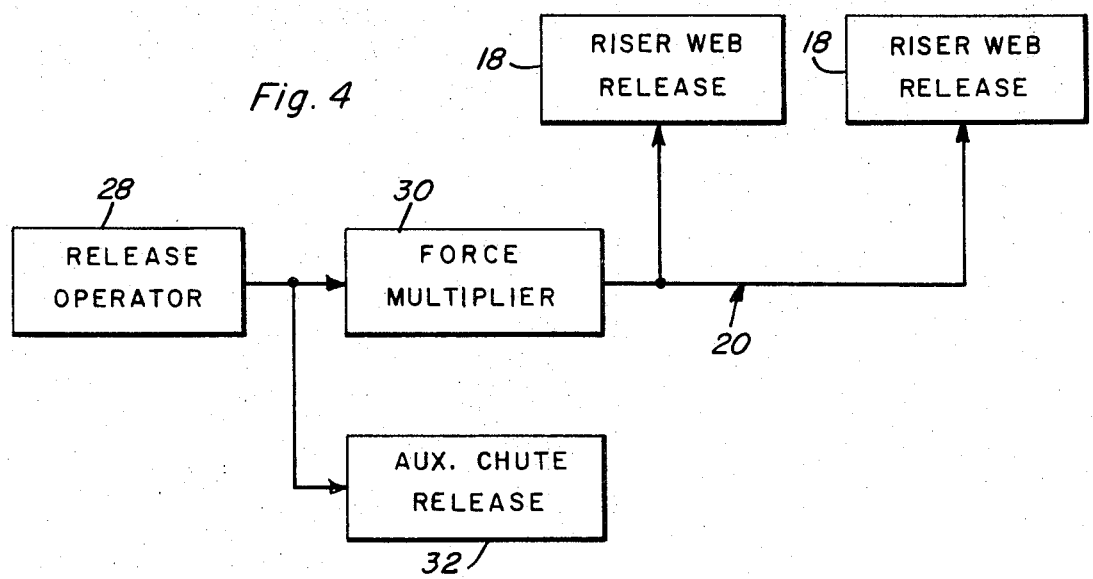
FIG. 4 is a block diagram functionally illustrating the control system of the present invention.

With continued reference to FIG. 1, an auxiliary parachute pack 22 of a conventional type is also mounted on the front of the body harness as shown. A remote control mechanism generally referred to by reference numeral 24 is carried on the pack and is connected to the push-pull cable assembly 20 at its input terminal 26. The cable assembly 20 extends from the control mechanism 24 around one side of the chutist and upwardly in back of the chutist, branching out along two paths to the two output terminals 19 respectively associated with the connector devices 18. The control mechanism 24 includes a manual operator 28 connected to the input terminal 26 of the push-pull cable assembly through a force multiplier generally referred to by reference numeral 30 and to an auxiliary chute release device generally referred to by reference numeral 32. As diagrammatically shown in FIG. 4, an actuating force is applied through the cable assembly 20 to the connector device 18 when the chutist exerts a pull on the operator 28. By means of the force multiplier 30, the required actuating force for disconnection of the connector devices 18, will be produced by an initial pull exerted on the operator 28. A continued pull on the operator following release of the main parachute canopy, will then operate the auxiliary chute release 32 in order to initiate deployment of the auxiliary parachute.

Figure 2:
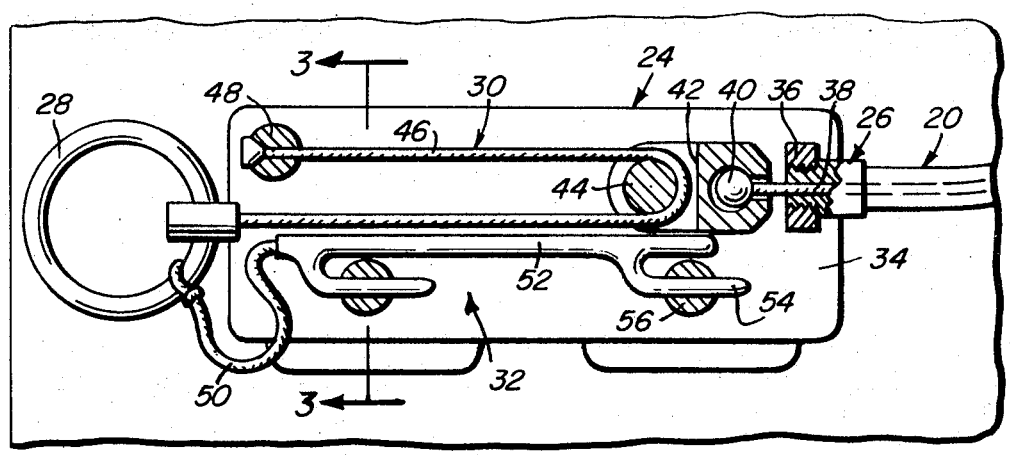
FIG. 2 is an enlarged partial front elevational view of the control system with parts shown in section.

Referring now to FIG. 2, the control mechanism 18 also includes a mounting plate 34 to which the input terminal 26 is threaded connected by the anchor 36. The push-pull cable assembly 20 is of a well known type wherein its stationary sheathing is fixed at its opposite end terminals in order to accommodate longitudinal displacement of an actuating cable such as the cable 38 shown in FIG. 2. The cable is connected by the terminal element 40 to the force multiplier 30 which includes a displaceable output element 42 having a roller 44 about which a cable 46 is entrained. One end of the cable 46 is connected to the manual operator 28 while the other end is secured to the mounting plate 34 by the anchor 48. Thus, a mechanical advantage is obtained in transmitting any pull from the operator 28 to the cable 26 connected to the output element 42 of the force multiplier.

Figure 3:
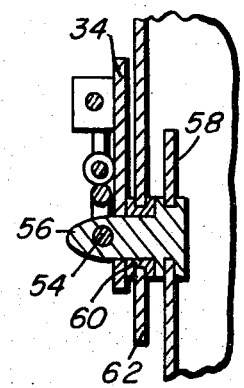
FIG. 3 is a partial transverse sectional view taken substantially through a plane indicated by section line 3—3 in FIG. 2.

As hereinbefore indicated, an initial pull on the operator 28 is operative through the force multiplier and the push-pull cable assembly 20 to disconnect the buckle connector devices 18. A continued pull on the operator 28 is operative through the slack cable section 50 to operate the auxiliary chute release device 32. The slack cable section 50 thus connects the operator 28 to an elongated lock member 52 having a pair of lock pin projections 54 that slidably extend through openings in a pair of corresponding fastener elements 56. As more clearly seen in FIG. 3, each of the fastener elements 56 is anchored to an inner flap 58 of the pack 22 and projects through a grommeted opening 60 in the outer flap 62 exposing the opening through which the lock pin projections 54 extend. Thus, the lock pins 54 not only hold the pack closed but also support the mounting plate 34 thereon and also prevent disassembly of the mounting plate 34 from the fastener elements 56 by means of which the mounting plate is carried on the pack. Additional facilities for securing the mounting plate of the control mechanism to the pack is thereby eliminated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a parachute harness, coupling means releasably connecting the harness to a main canopy; an auxiliary pack mounted on the harness enclosing an auxiliary canopy, elongated actuating means connected to said coupling means for disconnection thereof, and control means connected to the actuating means for sequentially disconnecting the coupling means and opening the auxiliary pack to deploy the auxiliary canopy subsequent to release of the main canopy.

2. The combination of claim 1 including force multiplying means interconnecting the control means with the actuating means.

3. The combination of claim 2 wherein said control means includes a mounting member to which the force multiplying means and the actuating means are anchored, a release operator connected to the force multiplying means, releasable lock means holding the auxiliary pack closed while supporting the mounting member thereon, and means connecting the operator to the lock means for disengagement thereof.

4. The combination of claim 3 wherein said lock means includes at least one fastener element projecting from the pack through an opening in the mounting member and a displaceable lock element connected to the operator by said connecting means in engagement with the fastener element.

5. The combination of claim 1 wherein said control means includes a mounting member to which the actuating means is anchored, a release operator connected to the force multiplying means, releasable lock means holding the auxiliary pack closed while supporting the mounting member thereon, and means connecting the operator to the lock means for disengagement thereof.

6. The combination of claim 5 wherein said lock means includes at least one fastener element projecting from the pack through an opening in the mounting member and a displaceable lock element connected to the operator by said connecting means in engagement with the fastener element.

7. The combination of claim 1 wherein said coupling means comprises a pair of connector devices and said actuating means includes a push-pull cable assembly.

8. In combination with a parachute harness and a canopy-enclosing pack mounted thereon, a remote control mechanism, a mounting member on which said mechanism is carried, lock means for holding the pack closed while supporting the mounting member thereon, and means connected to the lock means for release thereof following actuation of the control mechanism.

9. The combination of claim 8 wherein said lock means includes at least one fastener element projecting from the pack through an opening in the mounting member and a displaceable lock element connected to the operator by said connecting means in engagement with the fastener element.

10. The combination of claim 8 wherein said control mechanism includes a force multiplier and a push-pull cable assembly.

11. In combination with a parachute harness and coupling means connecting the harness to a main canopy, an auxiliary canopy, a pack enclosing said auxiliary canopy, releasable means for holding said pack closed, actuating means connected to the coupling means, and common control means connected to the actuating means and the releasable holding means for disconnecting the main canopy from the harness and opening the pack to release the auxiliary canopy.

12. The combination of claim 11, wherein the control means includes a mounting member secured to the pack by the releasable holding means.

* * * * *